No. 738,461. Patented September 8, 1903.

UNITED STATES PATENT OFFICE.

PHILIPP LEWY, OF CHARLOTTENBURG, GERMANY.

METHOD OF PREPARING OILS FOR MEDICINAL USE.

SPECIFICATION forming part of Letters Patent No. 738,461, dated September 8, 1903.

Application filed July 28, 1902. Serial No. 117,403. (No specimens.)

*To all whom it may concern:*

Be it known that I, PHILIPP LEWY, apothecary, a subject of the German Emperor, residing at 34 and 35 Grolmanstrasse, Charlottenburg, Germany, have invented certain new and useful Improvements in the Method of Preparing Oils and other Liquids for Medicinal Use, of which the following is a clear, full, and exact specification.

This invention relates to a process for the production in the form of powder of medicinal oils, both fatty and ethereal, and other remedies which have hitherto been used only in the liquid form.

The principal advantages of this method are that the medicines are more easily and conveniently taken and that they can readily be mixed with other dry substances.

The invention consists in the following process: A definite quantity of the substance to be used is made into a fine emulsion with gum arabic and water. To the emulsion is added a proportionate amount of burnt magnesia or magnesium carbonate, and the mixture is allowed to stand for several hours subjected to either heat or cold, when it forms a hard solid mass, which is then reduced to powder by any convenient means. All those substances which form an emulsion with gum arabic and water may be treated by this process, which can deal with not only volatile or drying oils or substances, but also non-drying oils or substances, such as castor-oil, cod-liver oil, sandal-oil, creosote, extractum filicis, &c.

Having thus described my invention, what I claim as new, and desire to protect by Letters Patent, is—

The herein-described process of preparing oils for medicinal use consisting in making a fine emulsion with oil, gum arabic and water, adding burnt magnesia, allowing the mixture to stand until it forms a solid mass, and then reducing the same to a powder, substantially as described.

In witness whereof I have hereunto set my hand in presence of two witnesses.

PHILIPP LEWY.

Witnesses:
 WM. EGGELIN,
 W. EISNERS.